Aug. 20, 1935.  H. E. COBB  2,011,851
CONTROL CIRCUIT
Filed April 11, 1934
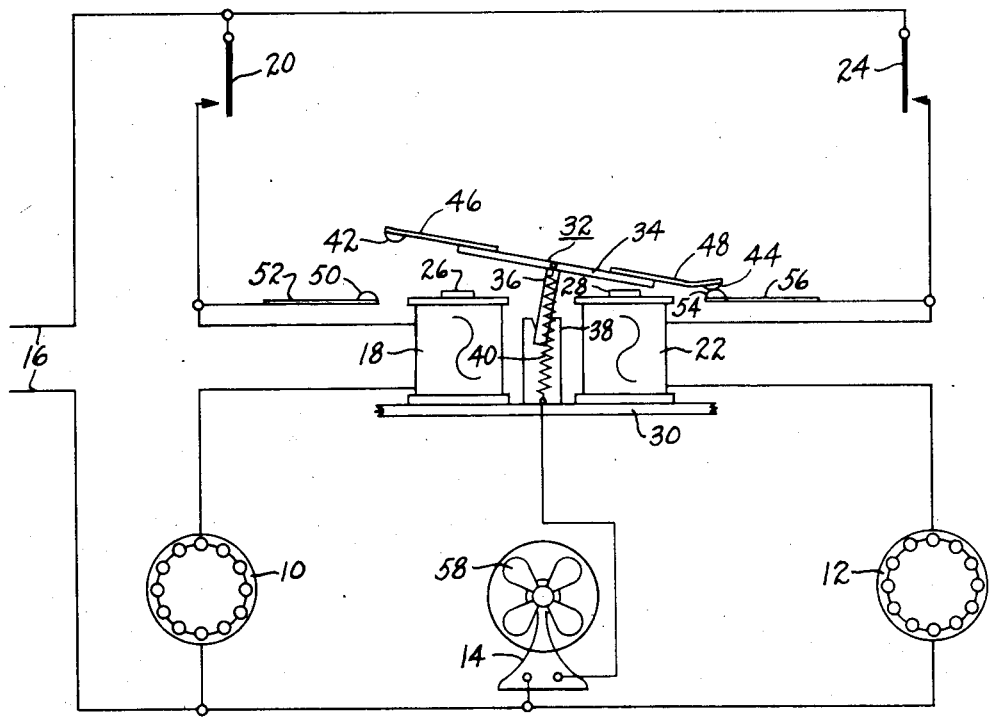
INVENTOR
Harold E. Cobb
BY
Spencer Hardman & Fehr
his ATTORNEYs Patented Aug. 20, 1935

2,011,851

UNITED STATES PATENT OFFICE 2,011,851

CONTROL CIRCUIT

Harold E. Cobb, Dayton, Ohio, assignor to General Motors Corporation, Detroit, Mich., a corporation of Delaware Application April 11, 1934, Serial No. 720,029

5 Claims. (Cl. 172—239)

This invention relates to a control circuit, and more particularly to a circuit for controlling the operation of an electric motor.

In the manufacture of certain refrigerating plants, it has been found more economical and advantageous to use two refrigerating units of a standard size to cool the refrigerating chamber, rather than to use one larger one that would have to be made special and in small quantities. It has further been found that one fan having its own propelling motor may satisfactorily be used to cool both of the refrigerating units. Hence, for best operation it is desirable to start the fan when either of the refrigerating units starts a cycle of operation, and to have the fan continue to operate as long as either, or both, of the refrigerating units is in operation. It is further desirable that if one refrigerating unit starts to operate while the other is running that the second unit does not disturb the operation of the fan, but that the unit which continues to run the longer assumes control of the fan. Although this invention is not limited to such an application, this does present one field of utility for the invention herein described.

It is therefore an object of this invention to provide a control system for an electric motor that starts and stops said motor in response to the operation of other apparatus in the system.

It is also an object of this invention to provide a control system for a motor, which system controls said motor in response to the operation of a plurality of other motors, so that when any of said other motors start, control of the operation of the first mentioned motor is effected.

Another object of this invention is to provide a system for controlling a first motor in response to the operation of a plurality of other intermittently operating motors, so that when one of said intermittently operating motors starts, it starts the first motor, and so that if another of said intermittently operating motors starts, it will not disturb the operation of the first motor, but will assume control of the first motor when the first of said intermittently operating motors ceases to operate.

Further objects and advantages of the present invention will be apparent from the following description, reference being had to the accompanying drawing wherein a preferred embodiment of the present invention is clearly shown.

In the drawing:

The single figure is a schematic diagram embodying a preferred form of the present invention, and is particularly adapted to controlling the operation of one motor in response to the operation of either of two other motors.

With particular reference to the drawing, motors 10, 12 and 14 each have one terminal connected to one side of a power supply line 16. The other terminal of the motor 10 is connected to the other side of the power supply line 16 through a winding of an electromagnet 18 and a switch 20, which switch is preferably normally open. The other terminal of the motor 12 is connected to the power supply line 16 thru a winding of an electromagnet 22 and a switch 24, which switch is also preferably normally open.

The electromagnets 18 and 22 have cores 26 and 28 respectively, and are preferably mounted on a base as indicated at 30. These electromagnets 18 and 22 are the actuating electromagnets of a switch 32, and their cores 26 and 28 respectively, are magnetically associated with a movable armature 34. Preferably, and as indicated, the armature is movably supported by cooperating bifurcated arms 36 and 38, the arm 36 being secured to the armature 34, and the arm 38 being secured to the base 30. The bifurcated arms 36 and 38 are urged into engagement by a spring 40 having one end attached to the armature 34 and the other end attached to the base 30. The armature is thus provided with a pivotal mounting so that it is movable toward either of the cores 26 or 28, and the spring 40 is preferably connected to the centers of the armature and base so that its center line of action crosses the pivotal axis to effect snap action of the switch and hold the armature in the position to which it was last operated. Contacts 42 and 44 are mounted on resilient members 46 and 48 respectively, which resilient members are secured to the armature 34. The contact 42 is in alignment for engagement with a cooperating stationary contact 50, which contact 50 is supported by a member 52. Likewise, the contact 54 is in alignment for engagement with the contact 44, and is supported by a member 56. When the armature is attracted toward the core 26, engagement of the contacts 42 and 50 is effected, and when the armature is attracted toward the core 28, engagement of the contact 44 and 54 is effected.

The contact 50 is connected to the end of the winding of the electromagnet 18 that is connected to the power supply line 16 through the switch 20. The contact 54 is connected to the end of the winding of the electromagnet 22 that is connected to the power supply line through the switch 24. A second terminal of the motor 14 is connected to the base 30 of the switch 32, and through the spring 40 and bifurcated arms 36 and 38 to the contacts 42 and 44. The motor 14 is indicated as having a fan 58 mounted thereon to be driven thereby.

In the operation of this circuit, the switches 20 and 24 may be manually operated, but are preferably controlled automatically by means such as sylphons, electromagnets or thermostats, not shown. When the switch 20, for example, is closed, the voltage of the power supply line 16 is applied to the motor 10 through the winding of the electromagnet 18 to operate the motor 10. The flow of current from the power supply line to the motor 10 through the winding of the electromagnet 18 energizes the electromagnet 18 to attract the armature 34 toward that electromagnet and effect engagement of the contacts 42 and 50. The engagement of the contacts 42 and 50 closes the circuit from the power supply line 16 to the motor 14 through the switch 20 and those contacts. When the circuit to the motor 10 is opened by the opening of the switch 20, that switch also opens the circuit to the motor 14.

If, however, while the motor 10 is still in operation, the circuit from the power supply line of the motor 12 is closed by the switch 24, the switch 32 remains operated to the position such that the contacts 42 and 50 are closed.

Then, when both of the motors 10 and 12 are operating, and one of those motors, such as the motor 10, ceases to operate, the armature 34 is attracted toward the core 28 so that the circuit to the motor 14 is closed through the contacts 44 and 54, and the motor 12 and switch 24 assume the control of the motor 14. This operation is effected by virtue of the fact that the electromagnets 18 and 22 and the switch 32 are so designed that when both magnets are energized, the pulling force of the electromagnet towards which the armature is actuated is sufficient to prevent movement of the armature toward the other electromagnet.

While the embodiment of the present invention as herein disclosed, constitutes a preferred form, it is to be understood that other forms might be adopted, all coming within the scope of the claims which follow.

What is claimed is as follows:

1. In combination, a plurality of electric motors adapted to be connected to a power supply line and including a first motor, a second motor and a third motor; means for intermittently connecting the first and second motors to the power supply line; and a switch for connecting the third motor to the power supply line when either the first or second motor is connected to the power supply line, said switch comprising cooperating contacts, a pivotally mounted armature for controlling the contacts, and a pair of electromagnets opposingly coacting on the armature, one of the electromagnets being connected in series with the first motor and one of the electromagnets being connected in series with the second motor.

2. In combination with a power supply line, a first dynamo electric machine; a second dynamo electric machine; an electric motor; means for separately connecting the first and second dynamo electric machine to the power supply line; and a switch having a plurality of electromagnets, one of which electromagnets is connected in series with each of said dynamo electric machines, and including a movable armature magnetically associated with said electromagnets and cooperating contacts controlled by the armature for connecting said motor to the power supply line.

3. In combination with a power supply line, a first motor; a second motor; a third motor; a switch for controlling the operation of the third motor responsive to the operation of the first and second motors, and including a pair of electromagnets magnetically associated with a common armature and cooperating contacts actuated by the armature, one of said electromagnets being connected in series with the first motor and the other of said electromagnets being connected in series with the second motor; and switch means connected intermediate each of electromagnets and one side of the power supply line.

4. In combination with a power supply line, a first motor; a second motor; a third motor; a switch means for controlling the connection of the third motor to the power supply line in response to the operation of the first and second motors, said switch means including a movable armature, two sets of cooperating contacts adapted to be closed at different positions of the armature, and a pair of electromagnets acting upon the armature to control the closing of the contacts, one contact of each of said pairs of contacts being connected to one of the electromagnets, one of the electromagnets being connected in series with the first motor and the other of the electromagnets being connected in series with the second motor; and a switch connected intermediate each of the first and second motors and the power supply line whereby the connection between the third motor and the power supply line thru one of said pairs of cooperating contacts is opened by one of said switches.

5. In combination with a power supply line, a plurality of electrical devices adapted to be connected to the power supply line including a first device, a second device and a third device; means for independently connecting the first and second devices to the power supply line to effect operation thereof; and a switch having a plurality of electromagnets opposingly coacting upon a common armature for effecting control of the third device responsive to the first and second devices, one of said electromagnets being connected to the first device, and one of the electromagnets being connected to the second device.

HAROLD E. COBB.